United States Patent
ter Haar Romenij et al.

(10) Patent No.: US 10,713,563 B2
(45) Date of Patent: Jul. 14, 2020

(54) OBJECT RECOGNITION USING A CONVOLUTIONAL NEURAL NETWORK TRAINED BY PRINCIPAL COMPONENT ANALYSIS AND REPEATED SPECTRAL CLUSTERING

(71) Applicant: Technische Universiteit Eindhoven, Eindhoven (NL)

(72) Inventors: Barend Marius ter Haar Romenij, Den Bosch (NL); Samaneh Abbasi Sureshjani, Eindhoven (NL)

(73) Assignee: Technische Universiteit Eindhoven, Eindhoven (NL)

( * ) Notice: Subject to any disclaimer, the term of this patent is extended or adjusted under 35 U.S.C. 154(b) by 0 days.

(21) Appl. No.: 15/822,982

(22) Filed: Nov. 27, 2017

(65) Prior Publication Data
US 2019/0164047 A1 May 30, 2019

(51) Int. Cl.
*G06N 3/08* (2006.01)
*G06K 9/62* (2006.01)
(Continued)

(52) U.S. Cl.
CPC .............. *G06N 3/08* (2013.01); *G06F 17/16* (2013.01); *G06K 9/4609* (2013.01);
(Continued)

(58) Field of Classification Search
CPC ..... A61B 5/7246; G06F 3/017; G06F 16/287; G06F 17/16; G06K 9/66; G06K 9/00355; G06K 9/00684; G06K 9/6247; G06K 9/6267; G06K 9/6234; G06K 9/6224; G06K 9/4609; G06N 3/08; G06N 3/084; G06N 3/0454
(Continued)

(56) References Cited

U.S. PATENT DOCUMENTS

| 7,308,134 | B2 | 12/2007 | Wersing |
| 7,457,749 | B2 | 11/2008 | Burges |

(Continued)

OTHER PUBLICATIONS

Kalunga, E., et al., "Data augmentation in Riemannian space for Brain-Computer Interfaces," STAMLINS, Jun. 2015, Lille, France.*
(Continued)

*Primary Examiner* — Xuemei G Chen
(74) *Attorney, Agent, or Firm* — Lumen Patent Firm

(57) ABSTRACT

A method of object recognition trains a convolutional neural network (CNN) with a set of training images, then classifies an image of an object using the trained CNN. A first layer of the CNN is trained by generating a set of first convolutional filters from eigenvectors produced from linear principal component analysis of patches of the training images. The training of each of multiple hidden layers CNN includes generating a set of convolutional filters from a selected subset of eigenvectors produced from linear principal component analysis of patches of an affinity matrix constructed using a set of prior convolutional filters from a prior layer of the CNN, where the affinity matrix represents correlations of feature vectors associated with the prior layer. The last layer of the CNN is trained with a regular classifier by error back-propagation using the training images and labels associated with the training images.

4 Claims, 2 Drawing Sheets

(51) Int. Cl.
  *G06N 3/04* (2006.01)
  *G06F 17/16* (2006.01)
  *G06K 9/46* (2006.01)
(52) U.S. Cl.
  CPC ......... *G06K 9/6224* (2013.01); *G06K 9/6234* (2013.01); *G06K 9/6247* (2013.01); *G06K 9/6267* (2013.01); *G06N 3/0454* (2013.01); *G06N 3/084* (2013.01)
(58) Field of Classification Search
  USPC .............................. 345/157; 434/85; 707/737
  See application file for complete search history.

(56) References Cited

U.S. PATENT DOCUMENTS

| | | | | |
|---|---|---|---|---|
| 9,232,211 | B2* | 1/2016 | Javidi | H04N 13/39 |
| 10,140,515 | B1* | 11/2018 | Waldo | G06K 9/00684 |
| 10,296,603 | B2* | 5/2019 | Dal Mutto | G06N 3/0454 |
| 10,444,759 | B2* | 10/2019 | Douillard | G06T 7/11 |
| 2006/0188849 | A1* | 8/2006 | Shamaie | G06K 9/00355 434/85 |
| 2013/0278501 | A1* | 10/2013 | Bulzacki | G06F 3/017 345/157 |
| 2015/0046457 | A1* | 2/2015 | Weinstein | G06F 16/287 707/737 |
| 2017/0154262 | A1* | 6/2017 | Sussillo | G06N 3/082 |
| 2017/0205385 | A1* | 7/2017 | Prystupa | G01N 21/65 |
| 2017/0311832 | A1* | 11/2017 | Barthelemy | A61B 5/7246 |
| 2018/0197049 | A1* | 7/2018 | Tran | G06K 9/66 |
| 2018/0289334 | A1* | 10/2018 | De Brouwer | A61B 5/4872 |
| 2019/0042895 | A1* | 2/2019 | Liang | G06K 9/00288 |
| 2019/0059851 | A1* | 2/2019 | Rothberg | A61B 8/4245 |
| 2019/0066845 | A1* | 2/2019 | Roy | G16H 40/40 |

OTHER PUBLICATIONS

Tian et al., "Stacked PCA Network (SPCANet): An effective deep learning for face recognition," 2015 IEEE International Conference on Digital Signal Processing (DSP), Jul. 2015.

Chan et al., "PCANet: A Simple Deep Learning Baseline for Image Classification?" IEEE Transactions on Image Processing ( vol. 24, Issue: 12, Dec. 2015 ), pp. 5017-5032.

Li, et al. "A pre-training strategy for convolutional neural network applied to Chinese digital gesture recognition" 2016 8th IEEE International Conference on Communication Software and Networks (ICCSN), Jun. 4-6, 2016.

Ren et al., "Convolutional Neural Network Based on Principal Component Analysis Initialization for Image Classification" 2016 IEEE First International Conference on Data Science in Cyberspace (DSC), Jun. 13-16, 2016.

* cited by examiner

OBJECT RECOGNITION USING A CONVOLUTIONAL NEURAL NETWORK TRAINED BY PRINCIPAL COMPONENT ANALYSIS AND REPEATED SPECTRAL CLUSTERING

FIELD OF THE INVENTION

The present invention relates generally to image analysis for object recognition. More specifically, it relates to techniques for image classification using convolutional neural networks.

BACKGROUND OF THE INVENTION

Image classification for object recognition is among the most important and well-known applications of convolutional neural networks. In such applications, a neural network is trained with a set of images that have been classified with labels. Once the network has learned this training data, it can then quickly analyze and classify arbitrary images. Training a network, however, can be time consuming and computationally complex.

A computational neural network contains a set of connected nodes organized in layers, where each layer provides output to a next layer based on input from a prior layer. The first layer is the input layer. The last layer is the output layer. Intermediate layers are called hidden layers. A neural network with more than one hidden layer is called a deep neural network. Typically, deep neural networks today have 5-150 hidden layers. Deep neural networks are able to learn more complex and abstract features of data (e.g., not only low level features such as edges and lines, but also higher level features such as shapes and arrangements of shapes). A common type of deep neural network is a convolutional neural network (CNN), where each layer generates a feature map. This feature map is convolved with filters to produce an output feature map. Conventionally, pooling is used to reduce the dimensionality of the feature maps.

Training of neural networks can use supervised learning or unsupervised learning. In unsupervised learning, the training data is not classified. The training clusters data, which corresponds to discovered features and classes. These classes, however, do not necessarily correspond to desired classifications. In supervised learning, the network is provided with classified training data. During training, the classified images are used to determine the weights in the network, e.g., using back propagation to adjust the weights to reduce the output error. Using back propagation to adjust weights through all levels of a network, however, can be computationally expensive, especially in the case of large training sets and convolutional networks having many layers. To make the training more manageable, the explosion of data to the next layer can be reduced with a 'max pooling' or 'mean pooling' technique. Even with these existing pooling techniques, however, back-propagation training of a CNN is still extremely complex and time-consuming.

BRIEF SUMMARY OF THE INVENTION

In one aspect, the invention provides a fast, automatic, unsupervised technique for training a deep convolutional neural network (CNN) for image analysis. In a first stage, the multi-layered deep cascade of neural networks is feed-forward trained by linear principal component analysis (PCA) on patches of the training images. The resulting eigenvectors are rich feature vectors, which represent convolutional filters/kernels. The number of feature vectors is reduced by using leading eigenvalues of the PCA to select a subset of eigenvectors. Eigenvalues typically decay fast in PCA, so the first limited set of eigenvalues describe a high percentage of the data, e.g. 95% or 99% described by just 5-8 eigenvalues. This reduction technique is far more accurate and efficient than existing pooling techniques.

The second and higher stages are feed-forward trained by convolving the filters with the training images to produce an affinity matrix by correlating feature vectors, then performing a linear PCA on patches of the affinity matrix (spectral clustering, graph cuts). PCA on this affinity matrix gives the basis for the 'active appearance' representation of this next layer. Due to the affinity, the context region of mutual influence is exploited, and PCA gives the most concise description. The output filters of this PCA on affinity (spectral clustering) stage are used to convolve this next layer, giving rise to a new set of more complex descriptive features. This process is repeated in increasingly larger contextual layers. For example, the first stage features may represent edges and corners, the second layer features may represent simple shapes, the third layer features may represent more complex shapes, and higher layer features may represent objects of different general types, such as particular kinds of objects. This CNN training is all done with feed-forward, unsupervised training, and is extremely efficient. At the end, a regular classifier is trained by conventional error back-propagation on the final few layer(s) of the network.

Thus, in one aspect, the invention provides a method of object recognition using a convolutional neural network (CNN), the method comprising training a CNN with a set of training images to produce a trained CNN; and classifying an image of an object using the trained CNN. The training of the CNN comprises, for each layer of multiple layers of the CNN, generating a set of convolutional filters associated with the layer from a selected subset of eigenvectors produced from linear principal component analysis of patches of an affinity matrix constructed using a set of prior convolutional filters from a prior layer of the CNN, where the affinity matrix represents correlations of feature vectors associated with the prior layer; and training a regular classifier by error back-propagation using the training images and labels associated with the training images. The selected subset of eigenvectors corresponds to eigenvalues larger than a threshold sufficient for the eigenvalues to collectively describe at least 95% of the patches. The training of the CNN may further comprise, for a first layer of the CNN, generating a set of first convolutional filters associated with the first layer from selected first layer eigenvectors produced from linear principal component analysis of patches of the training images. The training of the CNN may include i) performing linear principal component analysis of image patches of the training images to produce first layer eigenvectors and first layer eigenvalues; ii) selecting a subset of largest first layer eigenvalues and corresponding first layer eigenvectors; iii) producing from the selected first layer eigenvectors a set of first convolutional filters associated with a first layer of the convolutional neural network; iv) using the prior convolutional filters produced in the prior layer of the convolutional neural network to produce the feature vectors; v) constructing the affinity matrix by computing correlations (dot products) between the feature vectors, augmented with the Riemannian distance for co-circularity; vi) performing linear principal component analysis of patches of the affinity matrix to produce eigenvectors and associated eigenvalues; vii) selecting the selected subset of eigenvectors and corresponding eigenvalues by eigenvalue exponentiation and thresholding; viii) producing from the selected subset of eigenvectors the set of convolutional filters associated with the layer of the convolutional neural network; and ix) repeating steps iv), v), vi), vii), viii) for multiple layers of the convolutional neural network.

This unsupervised technique for feed-forward training of the hidden layers of a deep convolutional neural network (CNN) is very fast compared to the currently conventional error backpropagation method. The present invention thereby allows training with much larger training sets, providing higher accuracy for image analysis and object recognition, and/or making the CNN more 'senior expert' faster.

Accordingly, the invention provides, in one aspect, a very efficient method of object recognition, such as face and facial expression recognition, anatomy and pathology recognition in medical images, and texture recognition for histology microscopy slices of pathology. Other applications include obstacle and road sign recognition, fruit recognition for harvesting robots, recognition of hand-written characters, plant and flower recognition on agricultural auctions, fingerprint recognition, and other biometric identifier recognition.

DETAILED DESCRIPTION OF THE INVENTION

Embodiments of the present invention provide a method for image analysis and object recognition using a convolutional neural network (CNN) that is trained using principal component analysis (PCA) of small image patches in the first stage, and PCA of an affinity matrix in the second and subsequent stages. PCA allows images to be represented as a series expansion in increasingly larger contextual geometric primitives, i.e., every patch can be expressed as a weighted sum of the basis patches, which are the eigenvectors that the PCA returns. High data reduction is accomplished by eigenvalue pooling. This feed-forward, unsupervised training of the CNN is extremely fast compared to conventional techniques that use computationally complex back-propagation on all hidden layers of the CNN.

Figure 1:
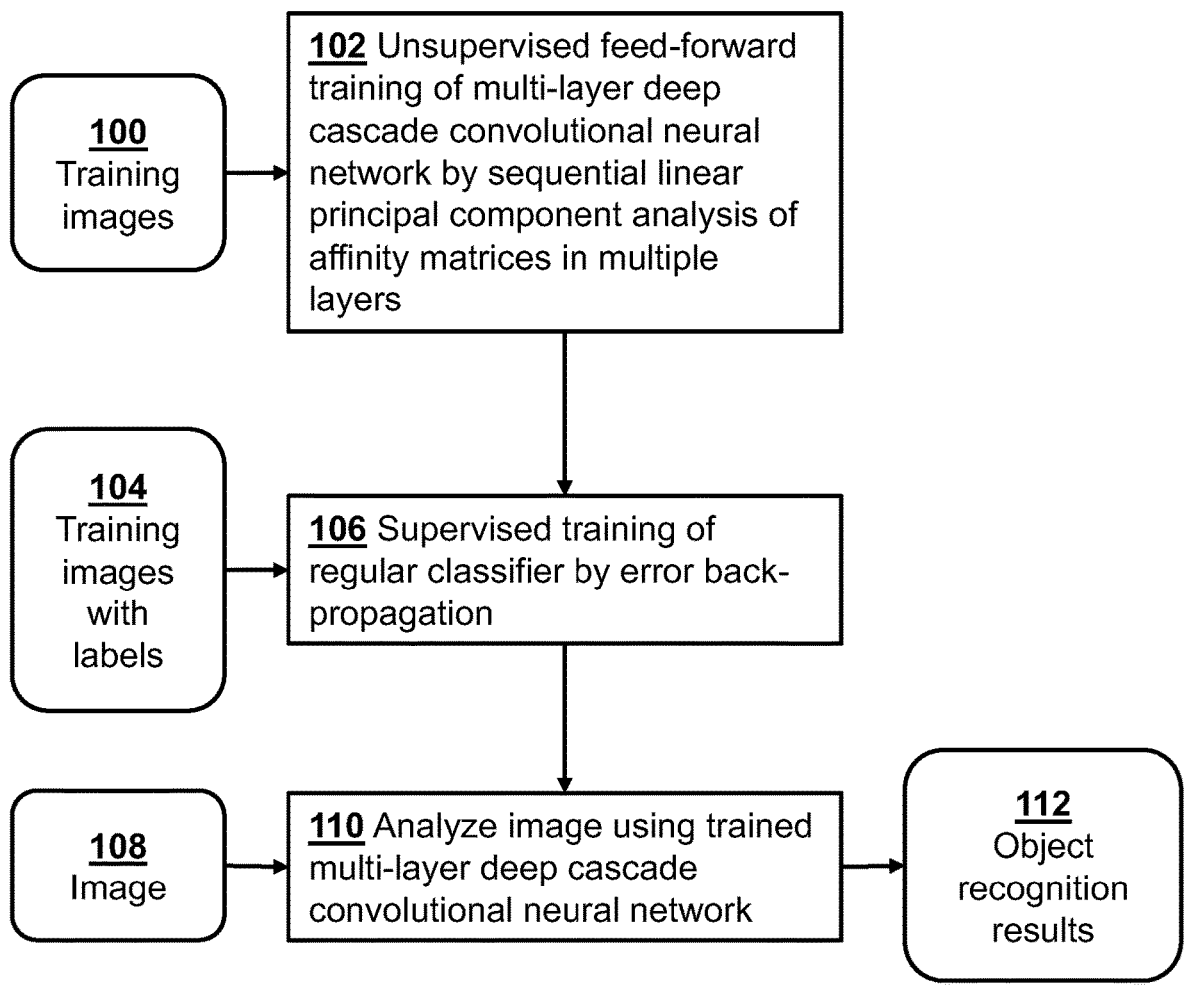
FIG. 1 is a flow chart providing an overview of the main steps of a method for object recognition using a convolutional neural network (CNN), according to an embodiment of the present invention.

FIG. 1 provides an overview of the main steps of object recognition using a convolutional neural network (CNN) according to one embodiment of the invention. In step 102, the hidden layers of the CNN are feed-forward trained using a set of training images 100. This training is unsupervised, i.e., the classification labels of the training images are not used. Also, the training of these hidden layers is feed-forward, i.e., it does not use back-propagation. As will be described in more detail below, the training involves sequential linear principal component analysis of affinity matrices in multiple hidden layers. This unsupervised training of hidden layers of the CNN results in a relatively small set of high-contextual coefficients as input to a regular classifier, e.g. Support Vector Machine (SVM), or Random Forest. Step 106 performs supervised training of this regular classifier on the last layer(s) using error back-propagation and a set 104 of training images with classification labels. This is highly efficient since it only involves one or a few of the last layers. Once the CNN is trained, it is used in step 110 to classify an unknown image 108, producing object recognition results 112, e.g., a set of probabilities corresponding to each of the image classification labels used in the supervised training step.

Figure 2:
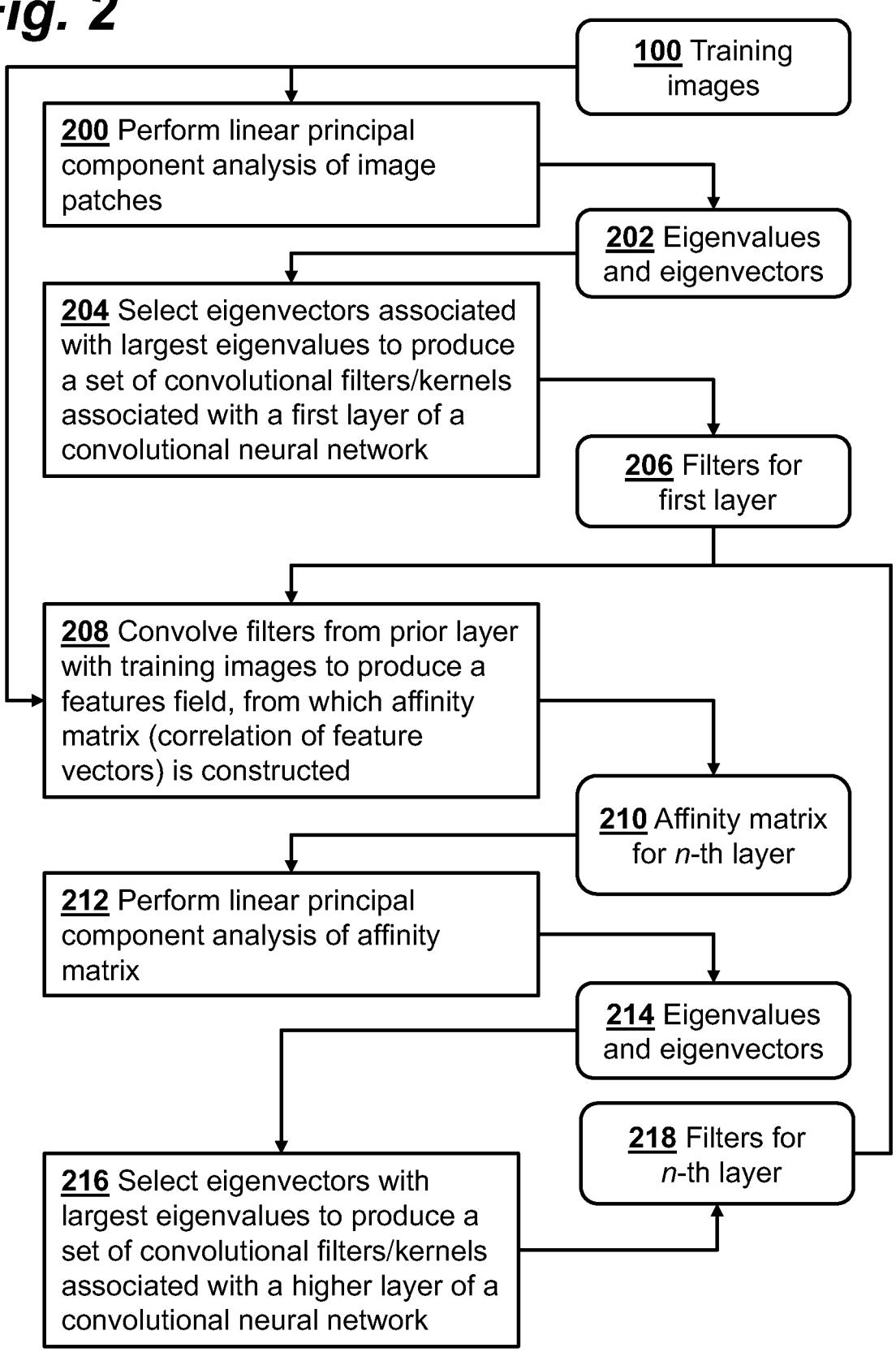
FIG. 2 is a flow chart outlining the main steps of a method of training a CNN with a set of training images to produce a trained CNN, according to an embodiment of the invention.

Details of step 102 of FIG. 1 are shown in FIG. 2, which is a flow chart outlining the main steps of a method of unsupervised feed-forward training of hidden layers of a CNN using the set of training images 100, according to an embodiment of the invention.

In step 200, linear principal component analysis is performed on image patches of the training images 100, resulting in a set 202 of eigenvectors (and corresponding eigenvalues).

In one implementation, each of the training images is used to generate a collection of square patches having $\delta$ pixels on a side, where $\delta$ is preferably 5-10 pixels. The patches may overlap, with centers of adjacent patches displaced by a stride of s pixels, where s is typically about ⅓ of the patch size. Each patch is preferably weighted with a Gaussian on-off-center surround kernel with standard deviation $\sigma$. This weighting helps reduce spurious resolution (false edges and corners) and does local mean subtraction.

Each $\delta \times \delta$ patch is stretched in a long column vector, $\delta^2$ long, and column vectors of all patches from all images are combined to form the columns of a new matrix, m, of size $\delta^2$. This matrix is typically rectangular. The square covariance matrix $m^T m$ is formed, and principal component analysis computes the eigenvectors and eigenvalues of $m^T m$, which are returned in ranked order. Each eigenvector has a length $\delta^2$, and there are $\delta^2$ eigenvectors, and $\delta^2$ eigenvalues.

These eigenvectors are a complete set of local spatial derivative operators that describe the local structure of the image. The eigenvectors are the local differential geometric basis, i.e. the spatial derivatives to high order. The PCA representation in this layer is equivalent to a local Taylor expansion, with very high order derivatives. As we have discrete data, these are Gaussian derivatives. These eigenvectors are partitioned into $\delta \times \delta$ kernels, or filters, giving, after convolution of the image with these kernels, a rich set of features per pixel. These kernels detect edges, corners, lines, and other primitives. They are $\delta \times \delta$ patches.

The eigenvalues corresponding to the set of eigenvalues describe how much of the basis is present in the observed data, and are returned in ranked order. They form the spectrum, and may be visualized using a screen plot. If the mean is not already subtracted by the center-surround filters in the preprocessing step, the first DC eigenvalue (and eigenvector) is discarded. Typically, the ranked set of magnitudes of the eigenvalues drops off fast, so only the first small subset suffices to describe most of the data. Thus, in step 204, the set 202 of eigenvectors (and eigenvalues) is reduced by selecting eigenvectors associated with largest eigenvalues, resulting in a set 206 of convolutional filters/kernels associated with the first layer of a convolutional neural network.

In a preferred implementation, the highest eigenvalues, cumulatively describing 95% of the data, or more preferably 99% of the data, are identified (typically 15 or fewer), and the rest is discarded. A sharper and better-defined threshold is found when the eigenvalues are exponentiated and thresholded. This 'eigenvalue pooling' results in a more natural data reduction than the conventional max-pooling used in CNNs.

In the first iteration of step 208, the filters 206 are convolved with training images 100, converting each pixel of the training images into a column vector, which describes the local geometric context of that pixel. These vectors form a features field, a filtered tensor image. From this, patches of a slightly larger area (say 20×20 pixels) are generated, with a stride of $s_a$, with $s_a$ typically between 3 pixels and the patch side length. The patch size increases with each iteration of step 208, growing to the entire image size in the last hidden layer.

Next, an affinity matrix 210 is constructed by computing the outer product of all pixels of the patches. The square affinity matrix is expressed as the correlation (dot product) between the feature vectors and represents how well pairs of 'feature stacks per pixel' are similar to each other. The affinity is composed of pairwise correlation of the large column feature vectors (dot product, very efficient), and the measure for co-circularity (the 'sub-Riemannian distance').

In step 212, PCA on the affinity matrix 210 produces a set of eigenvectors and eigenvalues 214. Similar to step 204, in step 216, a subset of eigenvectors with highest eigenvalues are selected, such that they describe again 95%, or more preferably, 99% of the data. The number of selected eigenvectors is typically smaller then 15-20. These eigenvectors are partitioned into square patches, which form the output convolutional filters 218. These kernels are visualized as square filters, and show typically the next contextual perceptual groups, the parts (for faces: elements of mouths, noses, eyes). PCA on this affinity matrix automatically learns features, used in consecutive affinity measurements, or learns affinities among image pixels directly, avoiding the necessity for feature extraction steps.

The filters 218 are used as input to the next iteration of step 208, where a convolution of the training images is again done with these larger kernels, PCA performed 212, and again pooling in step 216. These steps are repeated for multiple hidden layers of the CNN. The size in pixels of the affinity matrices (e.g. 30×30 pixels) remains constant (and thus the computational burden per layer), but the affinity patch is taken with increasingly larger area pixels ('coarser pixels'), until the full image size ('outer scale') is reached, or the size of the largest structure to classify. As scale is exponential, the increase in size is exponential (e.g. in steps of square root of 2). In practice, the affinity matrix is sparse, and only the region around the diagonal needs to be taken into the calculations. This explains why we use multiple layers: a slightly incremented contextual region can be represented extremely precise with limited basis functions.

After multiple iterations of steps 208, 212, 216, a PCA series expansion for high-level structures is learned. Each layer is a combination of active shape (ASM) and active appearance (AAM) models, which is a natural and very compact representation.

As shown in FIG. 1, once this unsupervised training 102 of the hidden layers of the CNN is completed, supervised training 106 using error backpropagation is done for the last layer, which gives the substantial speed-up during learning.

The methods of the present invention is preferably realized using appropriate hardware conventionally used for implementing a CNN. For example, it may be implemented using a state-of-the-art Graphical Processing Unit (GPU) realized as an integrated circuit with thousands of small CPU cores, which are parallel optimized for small tasks like convolutions. A GPU server, common in the deep learning application, may also be used.

The methods of the present invention may be used in applications involving object recognition. For example, in a face or facial expression recognition, after the CNN is trained with training images of faces tagged with appropriate labels, an image is analyzed by the trained CNN to produce a set of values, each representing a probability associated with one of the labels. The methods also have application in anatomy and pathology recognition, where the CNN is trained with a set of diagnostic images and associated labels. In automated or assistive vehicle control and navigation, the CNN can be trained with images for obstacle and road sign recognition. In agricultural applications, the CNN can be trained for recognizing types, sizes, and states of plants, flowers, and fruit for harvesting robots. Other applications include recognition of hand-written characters, fingerprints, and other biometrics.

The invention claimed is:

1. A method of object recognition using a convolutional neural network (CNN), the method comprising:
    a) training a CNN with a set of training images to produce a trained CNN; and
    b) classifying an image of an object using the trained CNN;
    wherein training the CNN comprises:
    for each layer of multiple layers of the CNN, generating a set of convolutional filters associated with the layer from a selected subset of eigenvectors produced from linear principal component analysis of patches of an affinity matrix constructed by convolving the set of training images with a set of prior convolutional filters from a prior layer of the CNN, where the affinity matrix represents correlations of feature vectors associated with the prior layer;
    training a regular classifier by error back-propagation using the training images and labels associated with the training images.

2. The method of claim 1 wherein the selected subset of eigenvectors corresponds to eigenvalues larger than a threshold sufficient for the eigenvalues to collectively describe at least 95% of the patches.

3. The method of claim 1 wherein training the CNN further comprises:
    for a first layer of the CNN, generating a set of first convolutional filters associated with the first layer from selected first layer eigenvectors produced from linear principal component analysis of patches of the training images.

4. The method of claim 1 wherein training the CNN comprises:
    i) performing linear principal component analysis of image patches of the training images to produce first layer eigenvectors and first layer eigenvalues;
    ii) selecting a subset of largest first layer eigenvalues and corresponding first layer eigenvectors;
    iii) producing from the selected first layer eigenvectors a set of first convolutional filters associated with a first layer of the convolutional neural network;
    iv) using the prior convolutional filters produced in the prior layer of the convolutional neural network to produce the feature vectors;
    v) constructing the affinity matrix by computing correlations (dot products) between the feature vectors, augmented with the Riemannian distance for co-circularity;

vi) performing linear principal component analysis of patches of the affinity matrix to produce eigenvectors and associated eigenvalues;
vii) selecting the subset of eigenvectors and corresponding eigenvalues by eigenvalue exponentiation and thresholding;
viii) producing from the selected subset of eigenvectors the set of convolutional filters associated with the layer of the convolutional neural network;
ix) repeating steps iv), v), vi), vii), viii) for multiple layers of the convolutional neural network.

\* \* \* \* \*